United States Patent
De et al.

(10) Patent No.: US 9,792,394 B2
(45) Date of Patent: Oct. 17, 2017

(54) ACCURATE GLITCH DETECTION

(71) Applicant: Synopsys, Inc., Mountain View, CA (US)

(72) Inventors: Kaushik De, Pleasanton, CA (US); Dipti Ranjan Senapati, Nayapalli Bhubaneswar (IN); Mahantesh D. Narwade, Bangalore (IN); Namit K. Gupta, San Jose, CA (US); Rajarshi Mukherjee, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/011,546

(22) Filed: Jan. 30, 2016

(65) Prior Publication Data

US 2017/0053051 A1  Feb. 23, 2017

Related U.S. Application Data

(60) Provisional application No. 62/208,092, filed on Aug. 21, 2015.

(51) Int. Cl.
*G06F 17/50* (2006.01)

(52) U.S. Cl.
CPC ........ *G06F 17/5045* (2013.01); *G06F 17/505* (2013.01); *G06F 2217/62* (2013.01)

(58) Field of Classification Search
CPC . G06F 17/5045; G06F 17/505; G06F 2217/62
USPC .................................. 716/103, 106
See application file for complete search history.

(56) References Cited

U.S. PATENT DOCUMENTS

| | | | | |
|---|---|---|---|---|
| 5,521,499 | A * | 5/1996 | Goldenberg et al. | H03K 5/13 327/237 |
| 6,894,540 | B1 * | 5/2005 | Ali et al. | H03K 5/1252 327/34 |
| 9,143,876 | B2 * | 9/2015 | Kropfitsch et al. | H04R 19/005 |
| 9,281,028 | B1 * | 3/2016 | Pyon et al. | |
| 2014/0103985 | A1 * | 4/2014 | Andreev et al. | H03K 5/131 327/262 |

* cited by examiner

*Primary Examiner* — Sun Lin
(74) *Attorney, Agent, or Firm* — Park, Vaughan, Fleming & Dowler LLP; Laxman Sahasrabuddhe

(57) ABSTRACT

Systems and techniques for detecting design problems in a circuit design are described. A higher-level abstraction of the circuit design can be synthesized to obtain a lower-level abstraction of the circuit design, and a mapping between signals in the higher-level abstraction and the signals in the lower-level abstraction. A design problem can be detected in the circuit design in response to determining that a possible glitch in a signal in the lower-level abstraction is not blocked when an enable signal is assigned a blocking value. The enable signal and the corresponding blocking value are identified by analyzing the higher-level abstraction.

20 Claims, 4 Drawing Sheets

ACCURATE GLITCH DETECTION

RELATED APPLICATION

This application claims benefit of U.S. Provisional Application Ser. No. 62/208,092, filed on 21 Aug. 2015, by the same inventors, the contents of which are herein incorporated by reference in their entirety.

BACKGROUND

Technical Field

This disclosure relates to circuit design. More specifically, this disclosure relates to accurate glitch detection on clock-domain crossing (CDC) paths.

Related Art

The importance of circuit verification cannot be overemphasized. Indeed, without circuit verification it would be impossible to create correct circuit designs for the large and complex integrated circuits (ICs) that are commonly found in electronic devices. There have been many cases in which an undetected bug in a circuit implementation had a significant impact on the company's finances. For example, in one well-publicized instance, a bug in a floating-point division circuit cost the company hundreds of millions of dollars. Therefore, it is important to identify problems in a circuit design at an early stage in the design process.

Today's complex circuit designs often include multiple clock domains. Signals that cross clock boundaries can cause data integrity problems if the signals are not synchronized properly. Therefore, it is important to identify and fix problems with circuitry that is designed to synchronize CDC signals.

SUMMARY

Some embodiments described herein provide methods and systems for accurately identifying problematic glitches in a circuit design. A "glitch" (e.g., a low-high-low transition, a high-low-high transition, etc.) can generally refer to a change in the value of a signal which, if propagated to an input of a register, can cause the circuit design to malfunction. Some glitches may be blocked by glitch blocking circuits. The glitches that are not blocked (e.g., because a glitch blocking circuit is missing or the glitch blocking circuit is not operating as intended) can be referred to as "problematic glitches" because these glitches can cause the circuit design to malfunction. Once a problematic glitch has been identified, the circuit design can be modified to prevent the problematic glitch from occurring or from propagating to the input of a register.

Some embodiments can analyze a higher-level abstraction of the circuit design to identify (1) a set of glitch-blocking circuits, (2) an enable signal corresponding to each glitch-blocking circuit, and (3) a blocking value corresponding to each enable signal which, when assigned to the enable signal, is supposed to cause the corresponding glitch-blocking circuit to block glitches. Next, the embodiments can analyze a lower-level abstraction of the circuit design to identify a possible glitch in a signal in the lower-level abstraction of the circuit design, wherein the lower-level abstraction of the circuit design is generated from the higher-level abstraction of the circuit design. The embodiments can then identify an enable signal in the lower-level abstraction of the circuit design that corresponds to a glitch-blocking circuit that is supposed to block glitches in the signal. Next, the embodiments can detect a design problem in the circuit design in response to determining that the possible glitch in the signal is not blocked when the enable signal is assigned a blocking value corresponding to the enable signal. Specifically, some embodiments can determine that the possible glitch in the signal is not blocked if the possible glitch can propagate to an input of one or more registers when the enable signal is assigned the blocking value corresponding to the enable signal.

Detecting a design problem in the circuit design can generally include to any technique or mechanism that provides information to a user about a circuit design problem associated with the problematic glitch. For example, some embodiments can provide a list of signals in the lower-level abstraction where problematic glitches were detected. In other embodiments, a list of signals in the higher-level abstraction that corresponds to the problematic glitches can be provided to the user. In yet another embodiment, glitch-blocking circuits in the higher-level abstraction may be identified that were supposed to block the problematic glitches.

The lower-level abstraction of the circuit design can be generated from the higher-level abstraction of the circuit design by using a synthesis tool. The synthesis tool can also output a mapping that associates signals in the higher-level abstraction with corresponding signals in the lower-level abstraction, and the enable signal in the lower-level abstraction of the circuit design can be identified by using this mapping. In some embodiments, the higher-level abstraction of the circuit design can be a register-transfer level (RTL) description of the circuit design, and the lower-level abstraction of the circuit design can be a netlist of the circuit design. In some embodiments, the signal can be a clock-domain crossing (CDC) signal, and the glitch-blocking circuit can be a CDC synchronization circuit that is supposed to prevent corruption of information carried by the signal when the signal crosses clock domains.

DETAILED DESCRIPTION

Figure 1A:
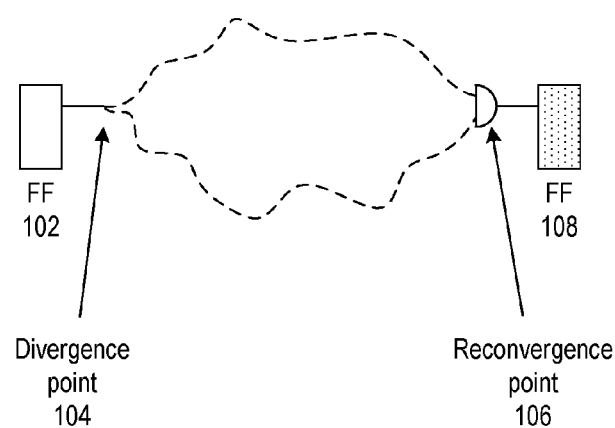
FIG. 1A illustrates a reason why a glitch may occur in a circuit design in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication. Some embodiments described herein can identify parts of a circuit design where glitches can propagate to an input of a register, thereby potentially causing the circuit design to malfunction.

Detecting Problematic Glitches

FIG. 1A illustrates a reason why a glitch may occur in a circuit design in accordance with some embodiments described herein. The output signal from flip-flop 102 may diverge at divergence point 104 and pass through multiple paths (each path can comprise one or more combinational logic gates) in the circuit design before reconverging at a logic gate (shown as reconvergence point 106 in FIG. 1A) whose output may be electrically connected to the input of flip-flop 108. Although two disjoint paths have been shown by dashed lines in FIG. 1A, there can be more than two disjoint paths that diverge and then reconverge. If flip-flop 102 and flip-flop 108 are in different clock domains, then a glitch may propagate to the input of flip-flop 108 because of the differences in the delays of the multiple paths. Circuit designs can include glitch-blocking circuitry to block such glitches so that the glitches do not propagate to an input of a register (e.g., a flip-flop).

Glitches can occur in CDC signals. According to one definition, a CDC signal can be (1) a signal that crosses from one clock domain to another clock domain, or (2) an asynchronous signal. A synchronization circuit can be added to a circuit design to ensure integrity of the information that is carried by CDC signals. The term "synchronization circuit" generally refers to any circuit that prevents corruption of the information carried by the CDC signal when the CDC signal crosses clock domains. Note that a synchronization circuit can also act as a glitch-blocking circuit because, in addition to preserving the integrity of the information carried in the CDC signal, the synchronization circuit can also block any glitches that may occur in the CDC signal.

Figure 1B:
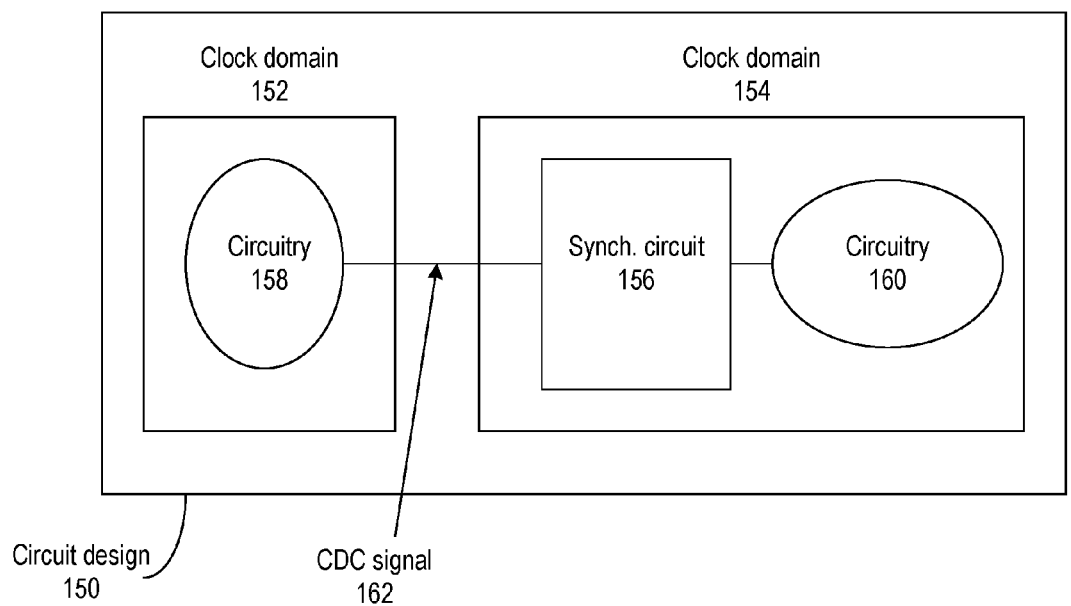
FIG. 1B illustrates how a synchronization circuit can be used in a circuit design that has multiple clock domains in accordance with some embodiments described herein.

FIG. 1B illustrates how a synchronization circuit can be used in a circuit design that has multiple clock domains in accordance with some embodiments described herein. Circuit design 150 can include clock domains 152 and 154. The circuitry within each clock domain can operate based on a corresponding clock signal. For example, circuitry 158 can operate based on a first clock signal (e.g., clock C1) and circuitry 160 can operate based on a second clock signal (e.g., clock C2). CDC signal 162 is a CDC signal because it crosses from clock domain 152 to clock domain 154. Synchronization circuit 156 can synchronize CDC signal 162 with the second clock signal before CDC signal 162 is provided to circuitry 160, thereby ensuring that the integrity of the information carried by CDC signal 162 is preserved across the clock domains.

Figure 2A:
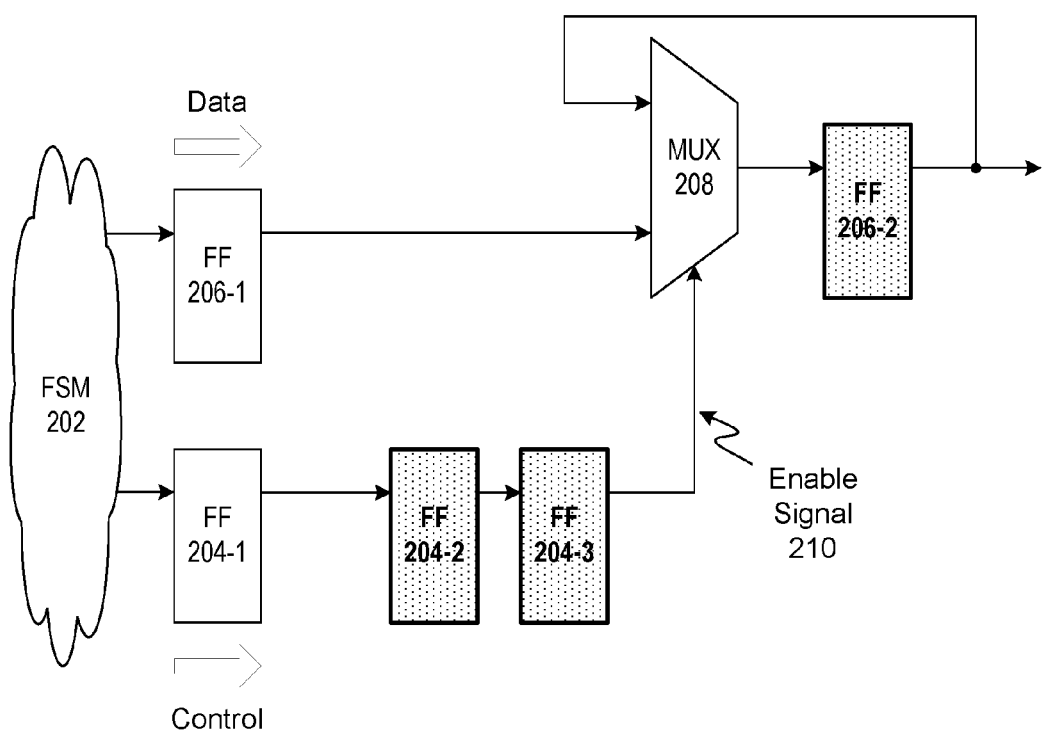
FIG. 2A illustrates an example of a synchronization circuit in accordance with some embodiments described herein.

FIG. 2A illustrates an example of a synchronization circuit in accordance with some embodiments described herein. Finite state machine (FSM) 202 can generally represent circuitry that generates data based on a first clock signal. In FIG. 2A, the data generated by FSM 202 needs to be provided to another circuitry in a different clock domain that operates based on a second clock signal. Flip-flops 204-1, 204-2, 204-3, 206-1, and 206-2, and multiplexer 208 can be part of the synchronization circuitry that ensures that the integrity of data generated by FSM 202 is preserved across the two clock domains. Specifically, the synchronization circuitry comprises a data path (flip-flops 206-1 and 206-2), a control path (flip-flops 204-1, 204-2, and 204-3), and gating circuitry (multiplexer 208), wherein the gating circuitry receives data from the data path and either blocks or passes the data based on a control input received from the control path. When the data is ready, FSM 202 sends a control signal to multiplexer 208 via the control path comprising flip-flops 204-1, 204-2, and 204-3. The control signal (shown in FIG. 2A as enable signal 210) causes multiplexer 208 to couple the output of flip-flop 206-1 with the input of flip-flop 206-2, thereby providing the data generated by FSM 202 to the circuitry that operates based on the second clock signal. U.S. application Ser. No. 14/673,338, entitled "Clock-domain-crossing specific design mutations to model silicon behavior and measure verification robustness," filed 30 Mar. 2015, includes additional examples CDC synchronization circuits (which are also glitch-blocking circuits), and is herein incorporated by reference in its entirety for all purposes.

A circuit design can be represented at different levels of abstraction. Typically, the circuit design representation changes from higher levels of abstraction to lower levels of abstraction as the circuit design progresses through the design flow. In general, it is easier for users to understand and analyze the functionality of a circuit design when the circuit design is represented at a higher level of abstraction. It is also easier to create software tools for automatically identifying glitch-blocking circuits in a circuit design (e.g., identifying CDC synchronization circuits in a circuit design) by analyzing a higher-level abstraction of a circuit design.

The hardware description language (HDL) level and register-transfer level (RTL) are examples of higher-level abstractions.

Lower levels of abstractions more accurately model the behavior of the IC chip that is produced after semiconductor manufacturing. Therefore, it is preferable to use a lower-level abstraction to determine whether or not a glitch can propagate to an input of a register in an IC chip. Synthesis can be performed on an RTL design to obtain a netlist, which is an example of a lower-level abstraction of the circuit design.

The circuit design in FIG. 2A may be represented using a higher-level abstraction such as RTL. An analysis tool can be used to identify CDC synchronization circuits in the circuit design, and can also be used to identify an enable signal and a blocking value for each of the identified CDC synchronization circuits. For example, once the analysis tool has identified the synchronization circuit shown in FIG. 2A, the analysis tool can identify the select signal for multiplexer 208 as enable signal 210 for the synchronization circuit. Next, the analysis tool can identify the value that enable signal 210 needs to have in order to electrically connect the top input of multiplexer 208 with the input of flip-flop 206-2. This value of enable signal 210 is the blocking value because when enable signal 210 is assigned this value, multiplexer 208 prevents the output of flip-flop 206-1 from propagating to the input of flip-flop 206-2.

In general, an analysis tool can analyze a higher-level abstraction of the circuit design to identify (1) a set of glitch-blocking circuits, (2) an enable signal corresponding to each glitch-blocking circuit, and (3) a blocking value corresponding to each enable signal which, when assigned to the enable signal, is supposed to cause the corresponding glitch-blocking circuit to block glitches.

Figure 2B:
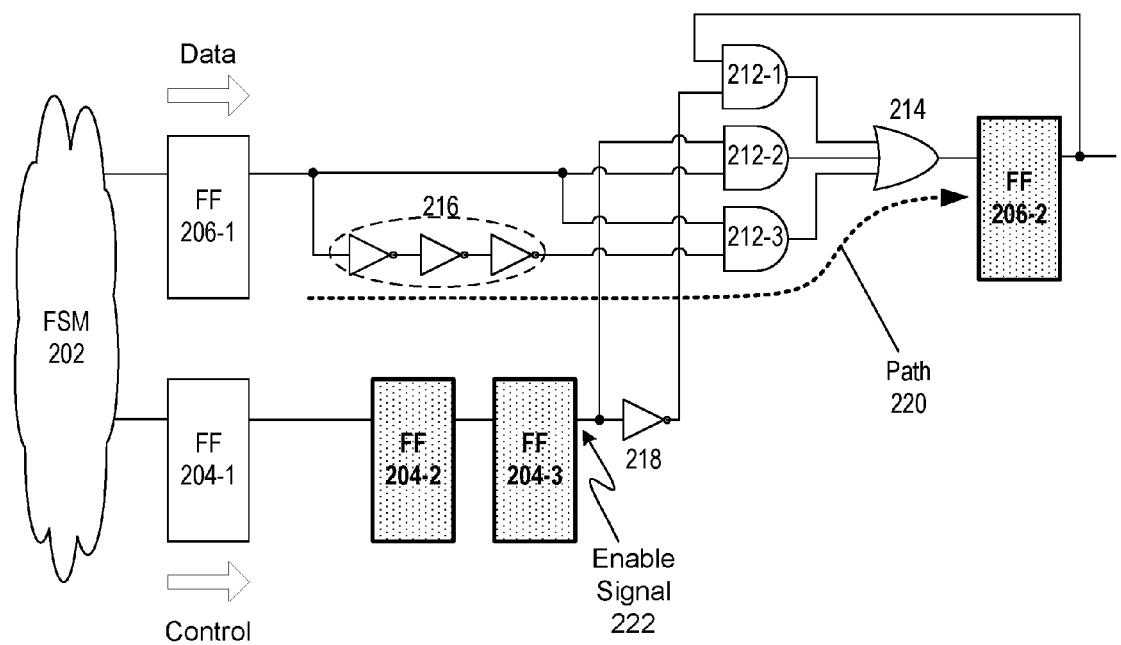
FIG. 2B illustrates a possible result of synthesizing the synchronization circuit in FIG. 2A in accordance with some embodiments described herein.

FIG. 2B illustrates a possible result of synthesizing the synchronization circuit in FIG. 2A in accordance with some embodiments described herein. The circuit design shown in FIG. 2B is for illustration purposes only and is not intended to represent an actual result of an actual synthesis tool.

A synthesis tool converts a circuit design representation from a higher-level abstraction to a lower-level abstraction while satisfying various constraints such as timing, area, and leakage power. To ensure that the synthesized lower-level abstraction meets all of the constraints, the synthesis tool typically performs a number of optimizations and transformations during synthesis. Consequently, the lower-level abstraction (e.g., netlist) produced by the synthesis tool may look very different from the higher-level abstraction (e.g., RTL design) that was inputted to the synthesis tool. It can be difficult, if not impossible, to determine the correspondence between signals in the higher-level abstraction (e.g., RTL design) and signals in the lower-level abstraction (e.g., netlist) by comparing the two representations. Therefore, in some embodiments described herein, the synthesis tool can keep track of the correspondence between signals in the higher-level abstraction (e.g., RTL design) and the signals in the lower-level abstraction (e.g., netlist), and can output this correspondence or mapping for later use.

For example, a synthesis tool may convert multiplexer 208 in FIG. 2A into a circuit that comprises inverter 218, inverter chain 216, "AND" gates 212-1, 212-2, and 212-3, and "OR" gate 214. The synthesis tool can also output the correspondence between enable signal 210 in the higher-level abstraction (e.g., RTL design) shown in FIG. 2A and enable signal 222 in the lower-level abstraction (e.g., netlist) shown in FIG. 2B.

As mentioned above, a lower-level abstraction (e.g., a netlist) of a circuit design is typically used for detecting potential glitches in the circuit design. This is because glitches are typically present in the lower-level abstraction (e.g., a netlist). Specifically, glitches can be caused when higher-level constructs in an RTL design are converted into gates, thereby creating reconvergent fanout situations as shown in FIG. 2B. In large circuit designs, a glitch detection tool may report a very large number of possible glitches in the lower-level abstraction of the circuit design. However, not all of these glitches are problematic because the circuit design may include glitch-blocking circuitry (e.g., CDC synchronization circuitry) to block many of these glitches from propagating to inputs of registers. For example, in FIG. 2A, multiplexer 208 can represent a convergence point where a glitch can occur. However, this glitch would be blocked by multiplexer 208 if the synthesized CDC synchronization circuit operates as intended, thereby preventing the glitch from propagating to the input of flip-flop 206-2. However, if multiplexer 208 was not present in the circuit design (e.g., because the CDC synchronization circuit was not correctly inserted into the CDC signal path), or if the CDC synchronization circuit was synthesized in a manner that causes glitches, then a glitch may propagate to the input of flip-flop 206-2. Note that a synthesized CDC synchronization circuit can be functionally correct (e.g., a functional verification tool may not report any problems in the netlist) and still cause glitches (this possibility is explained in more detail below).

Figure 3:
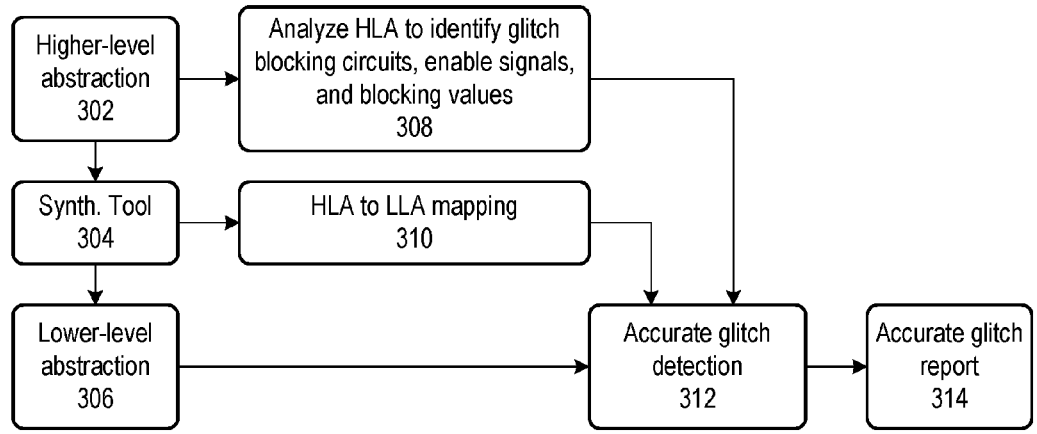
FIG. 3 illustrates a process for detecting problematic glitches in accordance with some embodiments described herein.

FIG. 3 illustrates a process for detecting problematic glitches in accordance with some embodiments described herein. Specifically, some embodiments described herein can identify the problematic glitches by filtering out the glitches that would be blocked by glitch-blocking circuits. Higher-level abstraction 302 (e.g., an RTL design) can be synthesized by synthesis tool 304 to obtain lower-level abstraction 306 (e.g., a netlist). The synthesis tool 304 can also output a higher-level abstraction to lower-level abstraction (HLA-to-LLA) mapping 310 that associates signals in the higher-level abstraction with corresponding signals in the lower-level abstraction. Next, the higher-level abstraction 302 can be analyzed to identify glitch blocking circuits, enable signals, and blocking values (operation 308). The process can then perform accurate glitch detection (operation 312) by using the lower-level abstraction 306 of the circuit design, the output from operation 308 which contains information about the glitch blocking circuits, enable signals, and blocking values, and the HLA-to-LLA mapping 310. The resulting accurate glitch report 314 can then be provided to the user.

Specifically, the process can analyze a lower-level abstraction of the circuit design to identify a possible glitch in a signal in the lower-level abstraction of the circuit design. Next, the embodiment can identify an enable signal in the lower-level abstraction of the circuit design that corresponds to a glitch-blocking circuit that is supposed to block glitches in the signal. Note that the embodiment can identify the enable signal in the lower-level abstraction of the circuit design by using a mapping that was generated by the synthesis tool that associates signals in the higher-level abstraction with corresponding signals in the lower-level abstraction. Next, the embodiment can propagate the glitch through the lower-level abstraction of the circuit design when the enable signal is assigned the blocking value. The embodiment can then detect a design problem in the circuit design in response to determining that the possible glitch in the signal is not blocked when the enable signal is assigned a blocking value corresponding to the enable signal.

Consider the lower-level abstraction shown in FIG. 2B. As explained above, a synthesis tool may convert multiplexer 208 in FIG. 2A into a circuit that comprises inverter 218, inverter chain 216, "AND" gates 212-1, 212-2, and 212-3, and "OR" gate 214. Note that when enable signal 222 is assigned a blocking value, the top input of "AND" gate 212-1 passes through, but the bottom input of "AND" gate 212-2 is blocked. Therefore, any glitch that may have occurred in the path that passes through "AND" gate 212-2 would have been blocked by assigning enable signal 222 a blocking value. However, a glitch may still propagate through "AND" gate 212-3 (shown by path 220) because this glitch is not blocked by enable signal 222. Therefore, in this case, the process would detect a design problem in the circuit design in response to determining that the possible glitch is not blocked (because the possible glitch can propagate to the input of register 206-2) when the enable signal 222 in FIG. 2B is assigned a blocking value corresponding to the enable signal 210 in FIG. 2A.

Note that FIG. 2B is an example where a glitch may propagate to an input of a register in the circuit design even though the higher-level abstraction includes a glitch-blocking circuit. If the synthesized circuit shown in FIG. 2B did not have "AND" gate 212-3, then a glitch would not have propagated, and the process would not have identified the circuit shown in FIG. 2B as a problem.

Once the process detects a problematic glitch, the process can provide information to a user about a circuit design problem associated with the problematic glitch. For example, some embodiments can provide a list of signals in the lower-level abstraction where problematic glitches were detected, e.g., the process can identify path 220 or the output of "AND" gate 212-3. In other embodiments, a list of signals in the higher-level abstraction that corresponds to the problematic glitches can be provided to the user, e.g., the process can identify the output of flip-flop 206-1 as a signal from where a problematic glitch can propagate to the input of flip-flop 206-2. In yet another embodiment, glitch-blocking circuits (e.g., CDC synchronization circuit shown in FIG. 2A), in the higher-level abstraction may be identified that were supposed to block the problematic glitches.

Glitch Detection System

Figure 4:
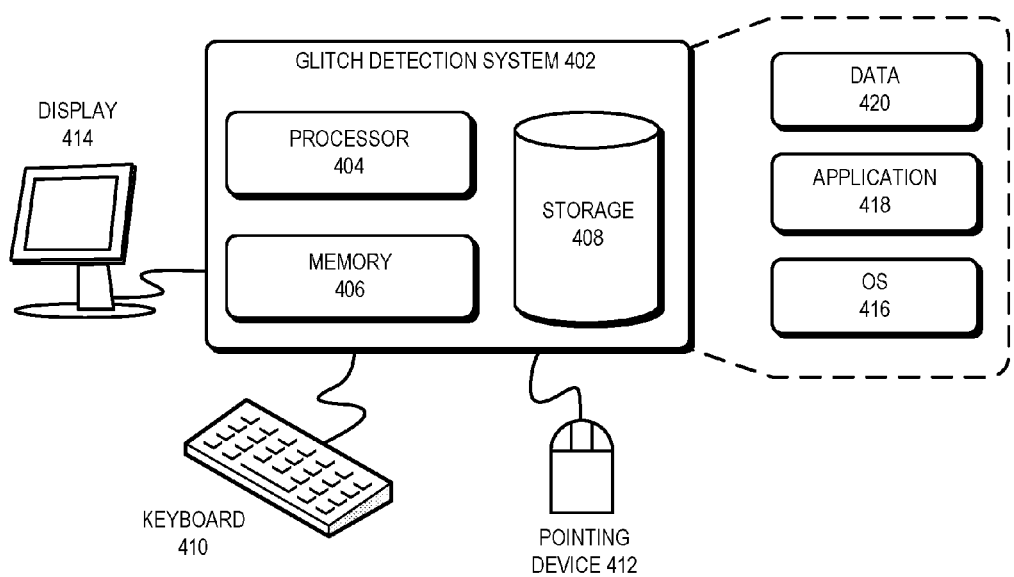
FIG. 4 illustrates a glitch detection system in accordance with some embodiments described herein.

The term "glitch detection system" refers to a hardware based system that is capable of identifying the problematic glitches in a circuit design. FIG. 4 illustrates a glitch detection system in accordance with some embodiments described herein. Glitch detection system 402 can include processor 404, memory 406, and storage device 408. Specifically, memory locations in memory 406 can be addressable by processor 406, thereby enabling processor 404 to access (e.g., via load/store instructions) and manipulate (e.g., via logical/floating point/arithmetic instructions) the data stored in memory 406. Glitch detection system 402 can be coupled to display device 414, keyboard 410, and pointing device 412. Storage device 408 can store operating system 416, glitch detection software tool 418, and data 420. Data 420 can include input required by glitch detection software tool 418 and/or output generated by glitch detection software tool 418.

Glitch detection system 402 may automatically (or with user help) perform one or more operations that are implicitly or explicitly described in this disclosure. For example, glitch detection system 402 can load glitch detection software tool 418 into memory 406, and glitch detection software tool 418 can then be used to identify problematic glitches in a circuit design.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) software tool in a computer, a method for detecting design problems in a circuit design, the method comprising:
   analyzing a higher-level abstraction of the circuit design to identify (1) a set of glitch-blocking circuits, and (2) for each glitch-blocking circuit in the set of glitch-blocking circuits:
   (i) an enable signal corresponding to the glitch-blocking circuit, and
   (ii) a blocking value corresponding to the enable signal which, when assigned to the enable signal, is supposed to cause the glitch-blocking circuit to block glitches;
   analyzing a lower-level abstraction of the circuit design to identify a possible glitch in a first signal in the lower-level abstraction of the circuit design, wherein the lower-level abstraction of the circuit design is generated from the higher-level abstraction of the circuit design;
identifying a first enable signal in the lower-level abstraction of the circuit design that corresponds to a glitch-blocking circuit that is supposed to block glitches in the first signal; and
detecting a design problem in the circuit design in response to determining that the possible glitch in the first signal is not blocked when the first enable signal is assigned a first blocking value corresponding to the first enable signal.

2. The method of claim 1, wherein the higher-level abstraction of the circuit design is a register-transfer level (RTL) description of the circuit design.

3. The method of claim 1, wherein the lower-level abstraction of the circuit design is a netlist of the circuit design.

4. The method of claim 1, wherein the first signal is a clock-domain crossing (CDC) signal, and the glitch-blocking circuit is a CDC synchronization circuit that is supposed to prevent corruption of information carried by the first signal when the first signal crosses clock domains.

5. The method of claim 1, wherein the lower-level abstraction of the circuit design is generated from the higher-level abstraction of the circuit design by using a synthesis tool.

6. The method of claim 5, wherein the first enable signal in the lower-level abstraction of the circuit design is identified by using a mapping generated by the synthesis tool that associates signals in the higher-level abstraction with corresponding signals in the lower-level abstraction.

7. The method of claim 6, wherein said detecting the design problem in the circuit design comprises using the mapping to identify a second signal in the higher-level abstraction that corresponds to the first signal in the lower-level abstraction.

8. The method of claim 1, wherein the possible glitch in the first signal is not blocked if the possible glitch can propagate to an input of one or more registers when the first enable signal is assigned the first blocking value corresponding to the first enable signal.

9. A non-transitory computer-readable storage medium storing instructions that, when executed by a computer, cause the computer to perform a method for detecting design problems in a circuit design, the method comprising:
analyzing a higher-level abstraction of the circuit design to identify (1) a set of glitch-blocking circuits, and (2) for each glitch-blocking circuit in the set of glitch-blocking circuits:
(i) an enable signal corresponding to the glitch-blocking circuit, and
(ii) a blocking value corresponding to the enable signal which, when assigned to the enable signal, is supposed to cause the glitch-blocking circuit to block glitches;
analyzing a lower-level abstraction of the circuit design to identify a possible glitch in a first signal in the lower-level abstraction of the circuit design, wherein the lower-level abstraction of the circuit design is generated from the higher-level abstraction of the circuit design;
identifying a first enable signal in the lower-level abstraction of the circuit design that corresponds to a glitch-blocking circuit that is supposed to block glitches in the first signal; and
detecting a design problem in the circuit design in response to determining that the possible glitch in the first signal is not blocked when the first enable signal is assigned a first blocking value corresponding to the first enable signal.

10. The non-transitory computer-readable storage medium of claim 9, wherein the higher-level abstraction of the circuit design is a register-transfer level (RTL) description of the circuit design.

11. The non-transitory computer-readable storage medium of claim 9, wherein the lower-level abstraction of the circuit design is a netlist of the circuit design.

12. The non-transitory computer-readable storage medium of claim 9, wherein the first signal is a clock-domain crossing (CDC) signal, and the glitch-blocking circuit is a CDC synchronization circuit that is supposed to prevent corruption of information carried by the first signal when the first signal crosses clock domains.

13. The non-transitory computer-readable storage medium of claim 9, wherein the lower-level abstraction of the circuit design is generated from the higher-level abstraction of the circuit design by using a synthesis tool.

14. The non-transitory computer-readable storage medium of claim 13, wherein the first enable signal in the lower-level abstraction of the circuit design is identified by using a mapping generated by the synthesis tool that associates signals in the higher-level abstraction with corresponding signals in the lower-level abstraction.

15. The non-transitory computer-readable storage medium of claim 14, wherein said detecting the design problem in the circuit design comprises using the mapping to identify a second signal in the higher-level abstraction that corresponds to the first signal in the lower-level abstraction.

16. The non-transitory computer-readable storage medium of claim 9, wherein the possible glitch in the first signal is not blocked if the possible glitch can propagate to an input of one or more registers when the first enable signal is assigned the first blocking value corresponding to the first enable signal.

17. A glitch detection system, comprising:
a processor; and
a non-transitory storage medium storing instructions that, when executed by the processor, cause the glitch detection system to perform a method for detecting design problems in a circuit design, the method comprising:
analyzing a higher-level abstraction of the circuit design to identify (1) a set of glitch-blocking circuits, and (2) for each glitch-blocking circuit in the set of glitch-blocking circuits:
(i) an enable signal corresponding to the glitch-blocking circuit, and
(ii) a blocking value corresponding to the enable signal which, when assigned to the enable signal, is supposed to cause the glitch-blocking circuit to block glitches;
analyzing a lower-level abstraction of the circuit design to identify a possible glitch in a first signal in the lower-level abstraction of the circuit design, wherein the lower-level abstraction of the circuit design is generated from the higher-level abstraction of the circuit design;
identifying a first enable signal in the lower-level abstraction of the circuit design that corresponds to a glitch-blocking circuit that is supposed to block glitches in the first signal; and
detecting a design problem in the circuit design in response to determining that the possible glitch in the first signal is not blocked when the first enable signal is assigned a first blocking value corresponding to the first enable signal.

18. The glitch detection system of claim 17, wherein the first signal is a clock-domain crossing (CDC) signal, and the glitch-blocking circuit is a CDC synchronization circuit that is supposed to prevent corruption of information carried by the first signal when the first signal crosses clock domains.

19. The glitch detection system of claim 17, wherein the lower-level abstraction of the circuit design is generated from the higher-level abstraction of the circuit design by using a synthesis tool, and wherein the first enable signal in the lower-level abstraction of the circuit design is identified by using a mapping generated by the synthesis tool that associates signals in the higher-level abstraction with corresponding signals in the lower-level abstraction.

20. The glitch detection system of claim 17, wherein the possible glitch in the first signal is not blocked if the possible glitch can propagate to an input of one or more registers when the first enable signal is assigned the first blocking value corresponding to the first enable signal.

\* \* \* \* \*